United States Patent
Lane

(10) Patent No.: US 6,556,990 B1
(45) Date of Patent: Apr. 29, 2003

(54) METHOD AND APPARATUS FOR FACILITATING WILDCARD SEARCHES WITHIN A RELATIONAL DATABASE

(75) Inventor: Robert M. Lane, Dixon, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/573,051

(22) Filed: May 16, 2000

(51) Int. Cl.[7] ............................................... G06F 17/30
(52) U.S. Cl. ............................... 707/6; 704/243; 704/1; 707/2; 707/3; 707/5
(58) Field of Search ............................... 707/2, 3, 6, 5; 704/1, 243

(56) References Cited

U.S. PATENT DOCUMENTS

| | | | | |
|---|---|---|---|---|
| 5,467,425 A | * | 11/1995 | Lau et al. ....................... | 704/7 |
| 5,706,365 A | * | 1/1998 | Rangarajan et al. ......... | 707/102 |
| 6,026,398 A | * | 2/2000 | Brown et al. .................. | 704/1 |
| 6,047,283 A | * | 4/2000 | Braun ............................ | 707/2 |
| 6,081,804 A | * | 6/2000 | Smith ............................ | 707/5 |
| 6,131,082 A | * | 10/2000 | Hargrave et al. .............. | 704/7 |
| 6,169,999 B1 | * | 1/2001 | Kanno .......................... | 707/532 |
| 6,199,062 B1 | * | 3/2001 | Byrne et al. .................... | 707/3 |
| 6,401,088 B1 | * | 6/2002 | Jagadish et al. ................ | 707/6 |

OTHER PUBLICATIONS

Hans–Joerg Schek and Georg Walch, Information retrieval with APL by Adaptive index and user guidance, ACM, pp. 385–392.*

Morita and Shinoda, Information filtering based on user behavior analysis and best match text retrieval, ACM, pp. 273–281.*

* cited by examiner

Primary Examiner—Jean R. Homere
Assistant Examiner—Leslie Wong
(74) Attorney, Agent, or Firm—Park, Vaughan & Fleming LLP

(57) ABSTRACT

One embodiment of the present invention provides a system that facilitates performing an efficient wildcard search on a field within a relational database table. The system operates by receiving a query with a search string that includes a wildcard and a sub-string. In order to process this query, the system identifies rows in a table in which a target column contains a string that matches search string. This is accomplished by looking up rows in the table that match the search string by looking up the sub-string in a sub-string index for the target column, wherein this sub-string index allows a given string in the target column to be rapidly identified based upon a sub-string of the given string. Next, the system accesses the matching rows in order to process the query. In one embodiment of the present invention, the wildcard is a leading wildcard that precedes the sub-string. In a variation on this embodiment, the search string additionally includes a trailing wildcard that follows the sub-string.

36 Claims, 4 Drawing Sheets

METHOD AND APPARATUS FOR FACILITATING WILDCARD SEARCHES WITHIN A RELATIONAL DATABASE

BACKGROUND

1. Field of the Invention

The present invention relates to performing searches in a relational database. More specifically, the present invention relates to a method and an apparatus for facilitating an efficient wildcard search within a relational database, wherein the wildcard search includes a leading wildcard.

2. Related Art

A relational database system allows a user to search through and manipulate data within relational tables. One very common operation is to search through a target column of a table within the relational database system looking for fields that match a desired "search string." In performing this type of string search, it is often useful to be able to include "wildcard" characters in the search string.

A search string that contains a wildcard character matches a given string if the given string can be produced by substituting a sub-string for the wildcard character. For example, if the "%" symbol is the wildcard character, the search string SAT% matches the following strings {SAT, SATE, SATIN, SATURDAY}. Because of this flexibility, wildcard characters can be very useful in searching for strings that have a specific pattern.

Unfortunately, there is presently no easy way to search for occurrences of a search string that contains both a leading wildcard character and a trailing wildcard character. In existing relational database systems, a search with a constraint of the form {column_name like '%string%'} requires a search through all of the rows of the relational table. Relational database searches in this form are generally considered to be degenerate and poorly formed because existing relational database systems are not able to efficiently perform such searches.

Performing a full table search on a table containing a terabyte of data can consume almost all of the resources of a computer system for an extended period of time in order to find matching records. Not only must each record be fetched, but most if not all of the data in the target column of each record must be searched.

What is needed is a method and an apparatus that facilitates efficiently performing a wildcard search on a target column of a relational database using a search, string that contains both a leading wildcard character and a trailing wildcard character.

SUMMARY

One embodiment of the present invention provides a system that facilitates performing an efficient wildcard search on a field within a relational database table. The system operates by receiving a query with a search string that includes a wildcard and a sub-string. In order to process this query, the system identifies rows in a table in which a target column contains a string that matches search string. This is accomplished by looking up rows in the table that match the search string by looking up the sub-string in a sub-string index for the target column, wherein this sub-string index allows a given string in the target column to be rapidly identified based upon a sub-string of the given string. Next, the system accesses the matching rows in order to process the query.

In one embodiment of the present invention, the wildcard is a leading wildcard that precedes the sub-string. In a variation on this embodiment, the search string additionally includes a trailing wildcard that follows the sub-string.

In one embodiment of the present invention, the system additionally creates the sub-string index for the target column prior to receiving the query.

In one embodiment of the present invention, the sub-string index includes a second table in the relational database. This second table includes a first column containing strings from the target column and second column containing corresponding sub-strings of the strings from the target column.

In one embodiment of the present invention, the sub-string index includes an internal index within the relational database that facilitates using a given sub-string to lookup at least one row in the table having a matching string in the target column.

In one embodiment of the present invention, the sub-string index is structured to lookup all sub-strings of the given string that are equal to or less than a maximum sub-string size.

In one embodiment of the present invention, the sub-string index is structured to lookup all sub-strings of the given string that include the last character of the given string.

One embodiment of the present invention provides a system that produces an index to facilitate an efficient wildcard search on a target column within a table in a relational database. The system operates by receiving a row for the table in the relational database. The system retrieves a string from the target column of the row, and then produces a plurality of sub-strings for the string. Next, the system uses the plurality of sub-strings to construct a sub-string index that facilitates looking up the row containing the string based upon one of the plurality of sub-strings.

In one embodiment of the present invention, the system additionally inserts the row into the table in the relational database.

In one embodiment of the present invention, the system additionally integrates the sub-string index into a global sub-string index for all strings in the target column in the table, wherein the global sub-string index facilitates looking up all strings in the target column that contain a given sub-string.

In one embodiment of the present invention, the global sub-string index includes a second table in the relational database, wherein the second table includes a first column containing strings from the target column and second column containing corresponding sub-strings of the strings from the target column.

In one embodiment of the present invention, the global sub-string index includes an internal index within the relational database that facilitates using the given sub-string to lookup at least one row in the table having a matching string in the target column which contains the given sub-string.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computing System

Figure 1:
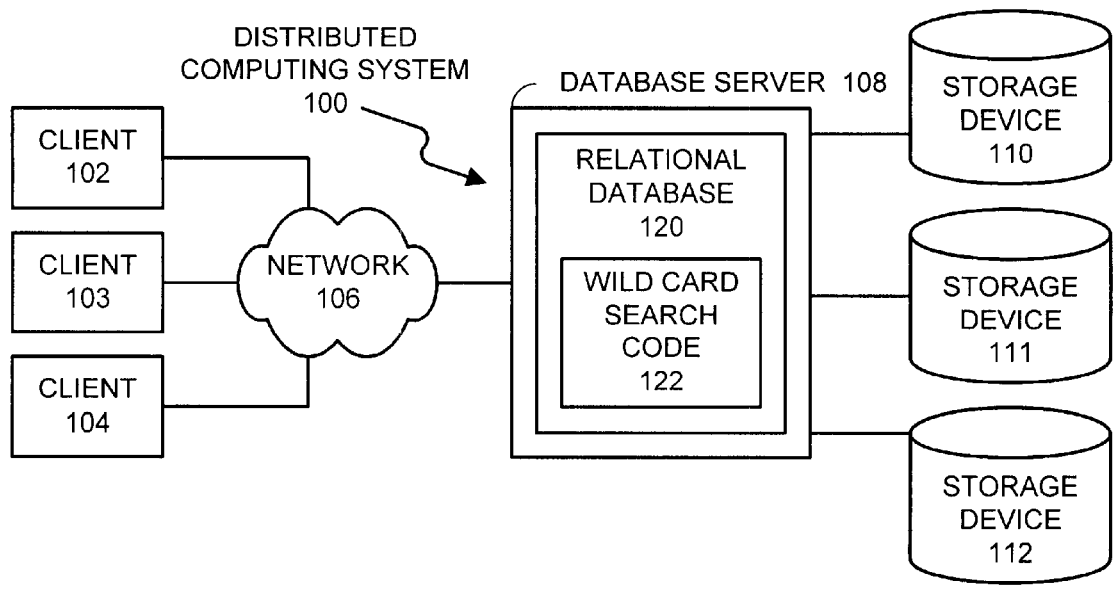
FIG. 1 illustrates a distributed computing system in accordance with an embodiment of the present invention.

FIG. 1 illustrates a distributed computing system 100 in accordance with an embodiment of the present invention. Distributed computing system 100 includes clients 102–104, which are coupled to database server 108 through network 106.

Clients 102–104 can include any node on network 106 including computational capability and including a mechanism for communicating across network 106. Network 106 can include any type of wire or wireless communication channel capable of coupling together computing nodes. This includes, but is not limited to, a local area network, a wide area network, or a combination of networks. In one embodiment of the present invention, network 106 includes the Internet.

Database server 108 can include any type of computer system that includes a database. In particular, database server 108 includes relational database 120, which includes mechanisms to perform relational queries on relational tables within relational database 120. Relational database 120 includes wildcard search code 122, which facilitates performing wildcard searches on tables within relational database 120 in accordance with an embodiment of the present invention. Portions of relational database 120 reside within storage devices 110–112, which are coupled to database server 108. Storage devices 110–112 can include any type of non-volatile storage device that can be coupled to database server 108. This includes, but is not limited to, magnetic, optical, and magneto-optical storage devices, as well as storage devices based on flash memory and/or battery-backed up memory.

Although the present invention is described within the context of a distributed computing system 100. The present invention can generally be applied to any type of computer system that can host a relational database system. This includes a stand-alone uniprocessor and/or multiprocessor computer system as well as a distributed computing system.

Sub-Strings

Figure 2A:
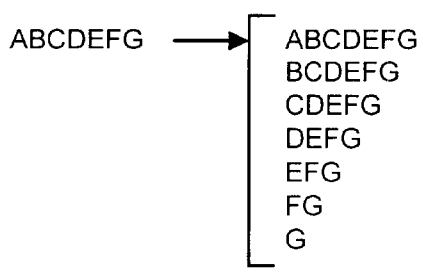
FIG. 2A illustrates an example of producing sub-strings for a given string in accordance with an embodiment of the present invention.

FIG. 2A illustrates an example of producing sub-strings for a given string in accordance with an embodiment of the present invention. In this example, the sub-strings of the string "ABCDEFG" include all sub-strings that contain the last character "G" of the string "ABCDEFG." More specifically, the sub-strings include, "ABCDEFG," "BCDEFG," "CDEFG," "DEFG," "EFG," "FG," and "G." This type of decomposition is useful for searches in which the terminal portion of a string is known. These sub-strings can be produced by the following code fragment which appears in Table 1.

TABLE 1

```
char *original_string;
char *index_pointer;
for (index_pointer=original_string;
    *index_pointer!=NULL; index_pointer++) {
    printf("%s|%s\n", original_string, index_pointer);
}
```

Note that the "|" symbol appears as a field separator in this code fragment. However, any appropriate character can serve the same purpose.

Figure 2B:
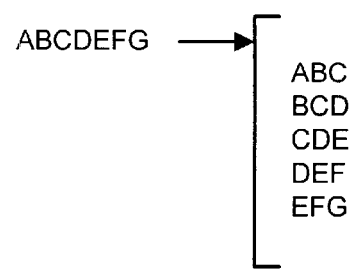
FIG. 2B illustrates another example of producing sub-strings for a given string in accordance with an embodiment of the present invention.

FIG. 2B illustrates another example of producing sub-strings for a given string in accordance with an embodiment of the present invention. In this example, the system produces all sub-strings of string "ABCDEFG" that have three characters. This includes sub-strings "ABC," "BCD," "CDE," "DEF" and "EFG." This type of decomposition is useful for searches with leading and trailing wildcard characters.

Note that FIG. 2A and FIG. 2B present only two examples of the many possible decompositions into sub-strings that can be used with the present invention. In general, any set of sub-strings of a given string can be used by the present invention. The choice of which set of sub-strings to use depends on the type of wildcard search that is expected and the amount of storage that is available to accommodate tables and/or indexes for the wildcard search.

Note that the above-described decompositions into sub-strings can be integrated into a primary table, an ancillary table, an index or a materialized view within relational database 120. Putting these decompositions into an index or a materialized view has certain advantages because the decomposition can take place as part of an insertion or an update of a row.

Tables and Indexes Involved in Wildcard Searches

Figure 3:
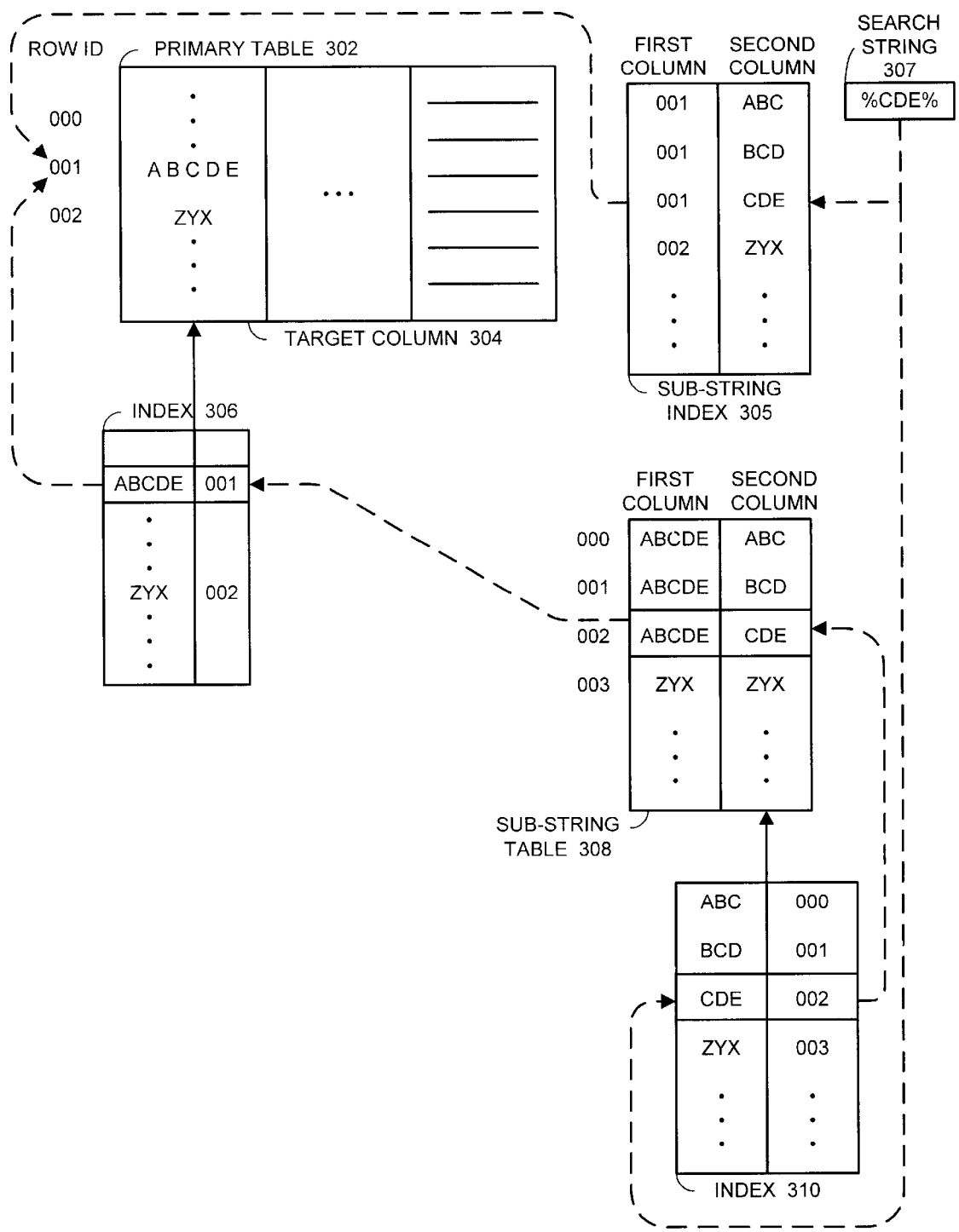
FIG. 3 illustrates various tables and indexes involved in performing a wildcard search in accordance with an embodiment of the present invention.

FIG. 3 illustrates various tables and indexes involved in performing a wildcard search in accordance with an embodiment of the present invention. The wildcard search involves a primary table 302 from relational database 120. Primary table 302 includes a target column 304 containing strings that are to be compared against a search string 307. Note that search string 307 includes a leading wildcard character, the sub-string "CDE," and a trailing wildcard character.

In one embodiment of the present invention, the index to facilitate wildcard searching is made part of an internal index within relational database 120. This embodiment is implemented by modifying an existing relational database system to include a special sub-string index 305 that facilitates wildcard searching based on sub-strings.

Sub-string index 305 includes a first column containing identifiers for rows within primary table 302, and a second column containing sub-strings associated with the strings in the rows in primary table 302. This allows the sub-string "CDE" to be used to lookup row identifier "001," which points to a row in primary table 302 containing the string "ABCDE" in target column 304.

In an alternative embodiment of the present invention, the index to facilitate wildcard searching is stored in a separate sub-string table 308 within relational database 120. Sub-string table 308 includes a first column containing strings from target column 304 of primary table 302, and a second column containing sub-strings associated with the strings in the first column.

In this embodiment of the present invention, an index 306 is additionally created for target column 304 of primary table 302, and another index 310 is created for the sub-string column in sub-string table 308.

During the lookup process, the sub-string "CDE" can be used to perform a lookup in index 310 to identify rows within sub-string table 308 that contain the sub-string "CDE." Once these rows are identified, the system examines the first column of each row to find the strings that correspond to the sub-string "CDE." In the example illustrated in FIG. 3, the string "ABCDE" corresponds to the sub-string "CDE." Next, the string "ABCDE" is used to perform a lookup in index 306 to identify the rows in primary table 302 that contain the string "ABCDE." Finally, the system selects the identified rows from primary table 302.

Process of Performing a Wildcard Search

Figure 4:
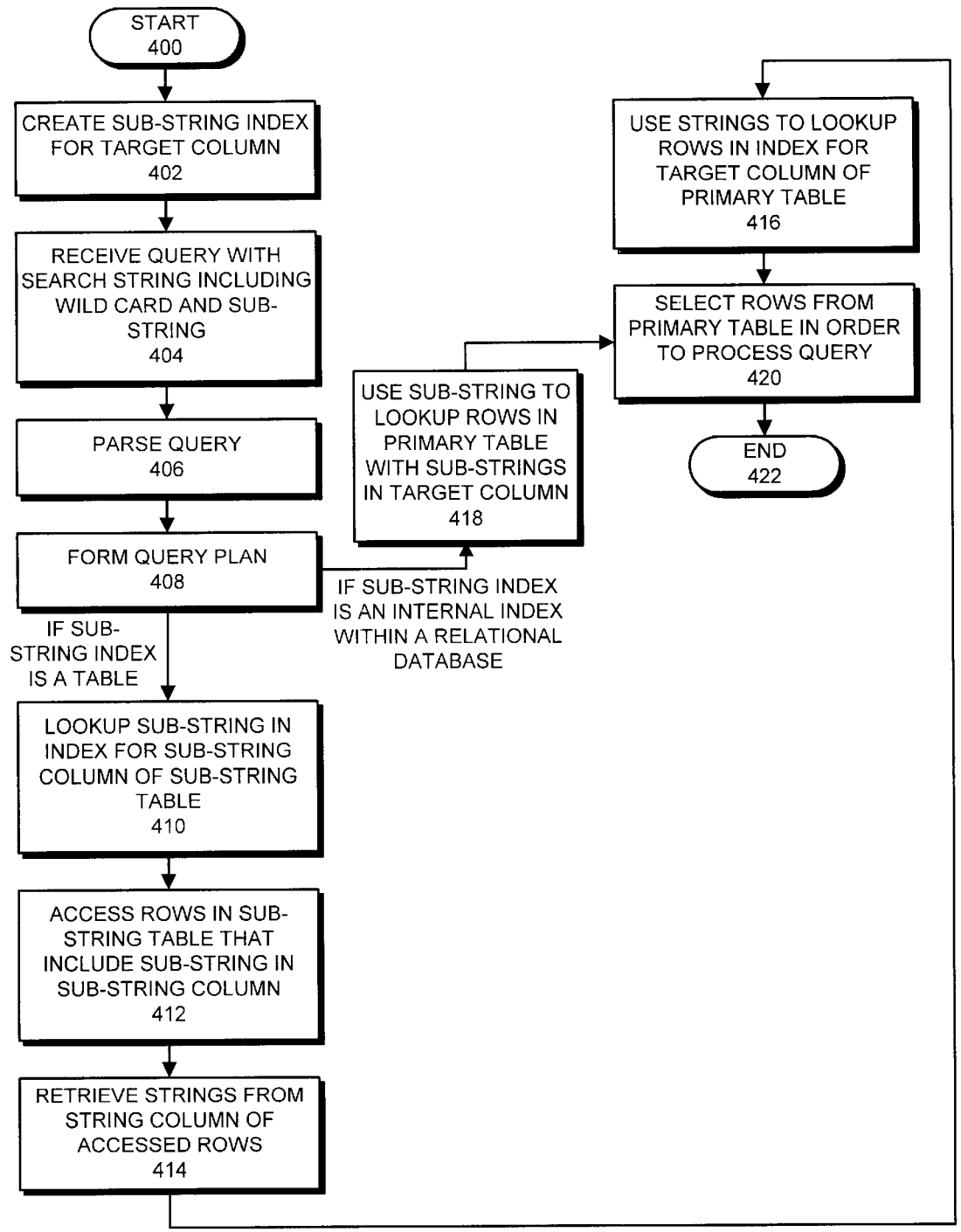
FIG. 4 illustrates the process of performing a wildcard search in accordance with an embodiment of the present invention.

FIG. 4 illustrates the process of performing a wildcard search in accordance with an embodiment of the present invention. The system first creates a sub-string index 305 or a sub-string table 308 for target column 304 of primary table 302 (step 402). This process is described in more detail below with reference to FIG. 5.

Next, the system receives a query from a user (step 404). This query includes a search string 307 with a sub-string and at least one wildcard character. The system then parses the query (step 406), and forms a query plan (step 408).

During the process of carrying out the query plan, the system uses the sub-string to lookup rows in primary table 302 which contain matching strings in target column 304.

If the sub-string index is part of an internal index, such as sub-string index 305 within relational database 120, the system uses the sub-string to perform a lookup in sub-string index 305 (step 418). This lookup returns at least one identifier for a row in primary table 302. This row identifier is used to select at least one row from primary table 302 in order to process the query (step 420). For example, in FIG. 3, sub-string "CDE" is used to lookup row identifier "001" from primary table 302, and row identifier "001" is used to select the row containing the string "ABCDE" from primary table 302.

If the sub-string index includes a table, such as sub-string table 308 within relational database 120, the system looks up the sub-string "CDE" in index 310 for the sub-string column (second column) of sub-string table 308 (step 410). Next, the system accesses rows in sub-string table 308 that include the sub-string "CDE" in the sub-string column (step 412). The system then retrieves the corresponding string "ABCDE" from the first column of sub-string table 308 (step 414). Next, the system uses the string "ABCDE" to lookup row identifier "001" from index 306 for target column 304 of primary table 302 (step 416). This row identifier "001" is used to select the row containing the string "ABCDE" from primary table 302 in order to process the query (step 420).

Note that an additional mechanism can be added to ensure that duplicate sub-strings only return one row. For example, the original string "ABABAB" contains "A," "B" and "AB" three times and "ABA" and "BAB" twice. This additional mechanism ensures that such an original string will only be returned once.

Process of Creating and Index for a Wildcard Search

Figure 5:
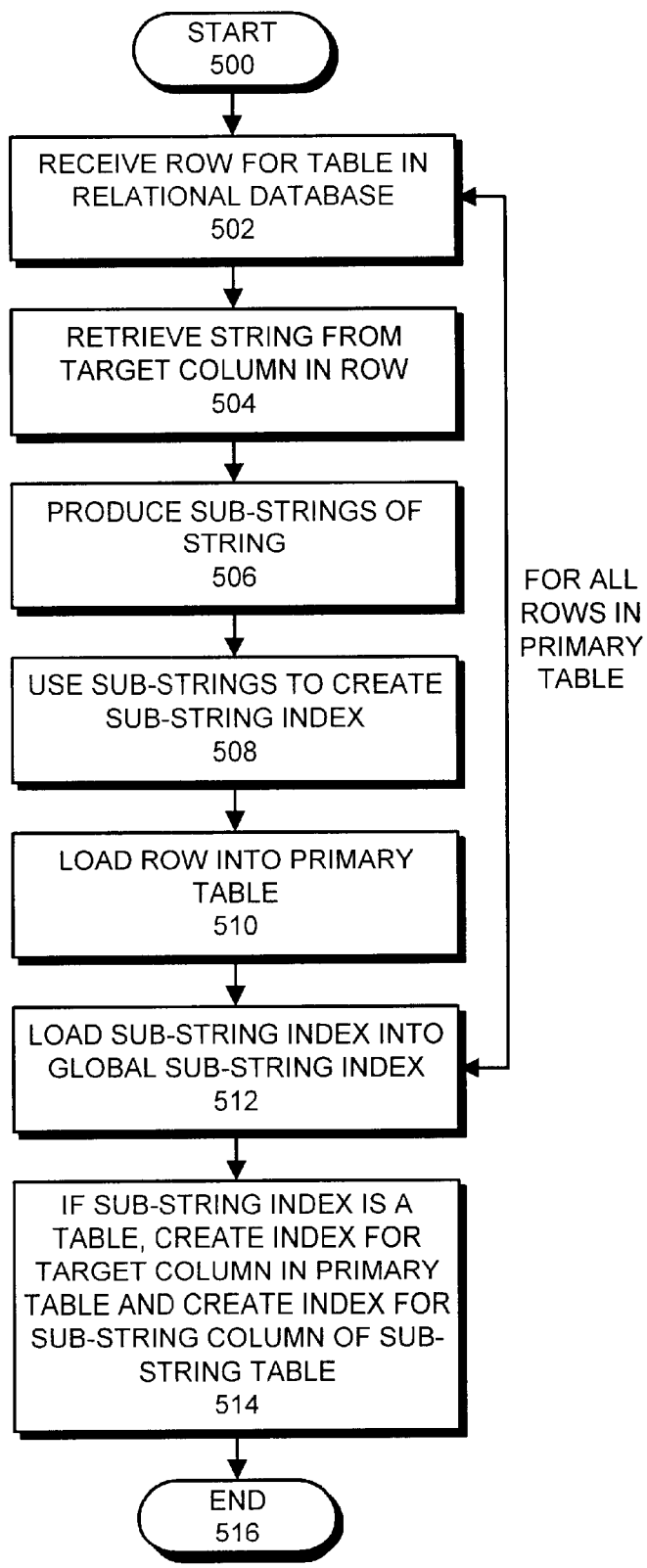
FIG. 5 illustrates the process of creating an index for a wildcard search in accordance with an embodiment of the present invention.

FIG. 5 illustrates the process of creating an index for a wildcard search in accordance with an embodiment of the present invention. The system starts by receiving a row for primary table 302 within relational database 120 (step 502). The system next retrieves a string from target column 304 of the row (step 504), and uses the string to create a set of sub-strings for the string (step 506). These sub-strings are used to create a sub-string index that can be used to locate the row containing the string based upon a sub-string (step 508).

Next, the system inserts the row into primary table 302 (step 510), and then loads the sub-string index into a global sub-string index (step 512). In one embodiment of the present invention, this global sub-string index includes an internal index within relational database 120, such as sub-string index 305 from FIG. 3. In another embodiment of the present invention, this sub-string index includes a table, such as sub-string table 308 from FIG. 3.

The system repeats steps 502 through 512 for all rows to be inserted into primary table 302. Note that this process of creating a sub-string index can be performed as rows are inserted into primary table 302, or alternatively, if the rows are already present in primary table 302, the sub-string index can be created by cycling through the rows of primary table 302.

If the sub-string index includes a table, such as sub-string table 308 from FIG. 3, the system creates an index 310 for the sub-string column (second column) of sub-string table 308. The system also creates an index 306 for target column 304 of primary table 302 (step 514). At this point the system is ready to perform wildcard lookups on target column 304 of primary table 302.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating an efficient wildcard search on a field within a relational database, comprising:
   receiving a query with a search string that includes a wildcard and a sub-string;
   wherein processing the query involves identifying rows in a table in the relational database in which a target column contains a string that matches search string;
   wherein matching the search string includes matching an expansion for the wildcard in the search string;

looking up matching rows in the table that match the search string by looking up the sub-string in a sub-string index for the target column, the sub-string index allowing a given string in the target column to be rapidly identified based upon a sub-strings of the given string, wherein the sub-string index includes a second table in the relational database, and wherein the second table includes a first column containing strings from the target column and second column containing corresponding sub-strings of the strings from the target column; and accessing the matching rows in order to process the query.

2. The method of claim 1, wherein the wildcard is a leading wildcard that precedes the sub-string.

3. The method of claim 2, wherein the search string additionally includes a trailing wildcard that follows the sub-string.

4. The method of claim 1, further comprising creating the sub-string index for the target column prior to receiving the query.

5. The method of claim 1, wherein the sub-string index includes an internal index within the relational database that facilitates using a given sub-string to lookup at least one row in the table having a matching string in the target column which contains the given sub-string.

6. The method of claim 1, wherein the sub-string index is structured to lookup all sub-strings of the given string that are equal to or less than a maximum sub-string size.

7. The method of claim 1, wherein the sub-string index is structured to lookup all sub-strings of the given string that include the last character of the given string.

8. A method for producing an index to facilitate an efficient wildcard search on a target column within a table in a relational database, comprising:

receiving a row for the table in the relational database;

retrieving a string from within the target column of the row;

producing a plurality of sub-strings of the string;

using the plurality of sub-strings to construct a sub-string index that facilitates looking up the row containing the string based upon one of the plurality of sub-strings; and integrating the sub-string index into a global sub-string index for all strings in the target column in the table, wherein the global sub-string index facilitates looking up all strings in the target column that contain a given sub-string and wherein the global sub-string index includes a second table in the relational database, and wherein the second table includes a first column containing strings from the target column and second column containing corresponding sub-strings of the strings from the target column.

9. The method of claim 8, further comprising inserting the row into the table in the relational database.

10. The method of claim 8, wherein the global sub-string index includes an internal index within the relational database that facilitates using the given sub-string to lookup at least one row in the table having a matching string in the target column which contains the given sub-string.

11. The method of claim 8, wherein the plurality of sub-strings include all sub-strings of the string that are equal to or less than a maximum sub-string size.

12. The method of claim 8, wherein the plurality of sub-strings include all sub-strings of the string that include the last character of the string.

13. A computer-readable storage medium storing instructions that when executed by a computer cause the computer to perform a method for facilitating an efficient wildcard search on a field within a relational database, the method comprising:

receiving a query with a search string that includes a wildcard and a sub-string;

wherein processing the query involves identifying rows in a table in the relational database in which a target column contains a string that matches search string;

wherein matching the search string includes matching an expansion for the wildcard in the search string;

looking up matching rows in the table that match the search string by looking up the sub-string in a sub-string index for the target column, the sub-string index allowing a given string in the target column to be rapidly identified based upon a sub-strings of the given string, wherein the sub-string index includes a second table in the relational database, and wherein the second table includes a first column containing strings from the target column and second column containing corresponding sub-strings of the strings from the target column; and accessing the matching rows in order to process the query.

14. The computer-readable storage medium of claim 13, wherein the wildcard is a leading wildcard that precedes the sub-string.

15. The computer-readable storage medium of claim 14, wherein the search string additionally includes a trailing wildcard that follows the sub-string.

16. The computer-readable storage medium of claim 13, wherein the method further comprises creating the sub-string index for the target column prior to receiving the query.

17. The computer-readable storage medium of claim 13, wherein the sub-string index includes an internal index within the relational database that facilitates using a given sub-string to lookup at least one row in the table having a matching string in the target column which contains the given sub-string.

18. The computer-readable storage medium of claim 13, wherein the sub-string index is structured to lookup all sub-strings of the given string that are equal to or less than a maximum sub-string size.

19. The computer-readable storage medium of claim 13, wherein the sub-string index is structured to lookup all sub-strings of the given string that include the last character of the given string.

20. A computer-readable storage medium storing instructions that when executed by a computer cause the computer to perform a method for producing an index to facilitate an efficient wildcard search on a target column within a table in a relational database, the method comprising:

receiving a row for the table in the relational database;

retrieving a string from within the target column of the row;

producing a plurality of sub-strings of the string;

using the plurality of sub-strings to construct a sub-string index that facilitates looking up the row containing the string based upon one of the plurality of sub-strings; and integrating the sub-string index into a global sub-string index for all strings in the target column in the table, wherein the global sub-string index facilitates looking up all strings in the target column that contain a given sub-string, wherein the global sub-string index includes a second table in the relational database, and wherein the second table includes a first column containing strings from the target column and second column containing corresponding sub-strings of the strings from the target column.

21. The computer-readable storage medium of claim 20, wherein the method further comprises inserting the row into the table in the relational database.

22. The computer-readable storage medium of claim 20, wherein the global sub-string index includes an internal index within the relational database that facilitates using the given sub-string to lookup at least one row in the table having a matching string in the target column which contains the given sub-string.

23. The computer-readable storage medium of claim 20, wherein the plurality of sub-strings include all sub-strings of the string that are equal to or less than a maximum sub-string size.

24. The computer-readable storage medium of claim 20, wherein the plurality of sub-strings include all sub-strings of the string that include the last character of the string.

25. An apparatus that facilitates an efficient wildcard search on a field within a relational database, comprising:
   a receiving mechanism that is configured to receive a query with a search string that includes a wildcard and a sub-string;
   wherein processing the query involves identifying rows in a table in the relational database in which a target column contains a string that matches search string;
   wherein matching the search string includes matching an expansion for the wildcard in the search string;
   a lookup mechanism that is configured to look up matching rows in the table that match the search string by looking up the sub-string in a sub-string index for the target column, the sub-string index allowing a given string in the target column to be rapidly identified based upon a sub-strings of the given string, wherein the sub-string index includes a second table in the relational database, and wherein the second table includes a first column containing strings from the target column and second column containing corresponding sub-strings of the strings from the target column; and
   an access mechanism that is configured to access the matching rows in order to process the query.

26. The apparatus of claim 25, wherein the wildcard is a leading wildcard that precedes the sub-string.

27. The apparatus of claim 26, wherein the search string additionally includes a trailing wildcard that follows the sub-string.

28. The apparatus of claim 25, further comprising an index creation mechanism that is configured to create the sub-string index for the target column prior to receiving the query.

29. The apparatus of claim 25, wherein the sub-string index includes an internal index within the relational database that facilitates using a given sub-string to lookup at least one row in the table having a matching string in the target column which contains the given sub-string.

30. The apparatus of claim 25, wherein the sub-string index is structured to lookup all sub-strings of the given string that are equal to or less than a maximum sub-string size.

31. The apparatus of claim 25, wherein the sub-string index is structured to lookup all sub-strings of the given string that include the last character of the given string.

32. An apparatus that produces an index to facilitate an efficient wildcard search on a target column within a table in a relational database, comprising:
   a receiving mechanism that is configured to receive a row for the table in the relational database;
   a retrieving mechanism that is configured to retrieve a string from within the target column of the row;
   a sub-string generation mechanism that is configured to generate a plurality of sub-strings of the string;
   an index creation mechanism that is configured to use the plurality of sub-strings to construct a sub-string index that facilitates looking up the row containing the string based upon one of the plurality of sub-strings; and
   an index integration mechanism that is configured to integrate the sub-string index into a global sub-string index for all strings in the target column in the table, wherein the global sub-string index facilitates looking up all strings in the target column that contain a given sub-string, wherein the global sub-string index includes a second table in the relational database, and wherein the second table includes a first column containing strings from the target column and second column containing corresponding sub-strings of the strings from the target column.

33. The apparatus of claim 32, further comprising an insertion mechanism that is configured to insert the row into the table in the relational database.

34. The apparatus of claim 32, wherein the global sub-string index includes an internal index within the relational database that facilitates using the given sub-string to lookup at least one row in the table having a matching string in the target column which contains the given sub-string.

35. The apparatus of claim 32, wherein the plurality of sub-strings include all sub-strings of the string that are equal to or less than a maximum sub-string size.

36. The apparatus of claim 32, wherein the plurality of sub-strings include all sub-strings of the string that include the last character of the string.

* * * * *